(12) United States Patent
Park et al.

(10) Patent No.: US 8,794,538 B2
(45) Date of Patent: Aug. 5, 2014

(54) HOT WATER CIRCULATION SYSTEM ASSOCIATED WITH HEAT PUMP

(75) Inventors: Dae Sam Park, Changwon (KR); Jin Woo Who, Changwon (KR)

(73) Assignee: LG Electronics Inc., Seoul (KR)

( * ) Notice: Subject to any disclaimer, the term of this patent is extended or adjusted under 35 U.S.C. 154(b) by 1026 days.

(21) Appl. No.: 12/314,025

(22) Filed: Dec. 2, 2008

(65) Prior Publication Data

US 2010/0025488 A1   Feb. 4, 2010

(30) Foreign Application Priority Data

Aug. 4, 2008 (KR) .................. 10-2008-0076017

(51) Int. Cl.
  *F24D 11/02* (2006.01)
  *F24D 3/18* (2006.01)
(52) U.S. Cl.
  USPC .......................................... 237/2 B; 237/19
(58) Field of Classification Search
  USPC .................................. 237/2 B, 19
  See application file for complete search history.

(56) References Cited

U.S. PATENT DOCUMENTS

| | | | | |
|---|---|---|---|---|
| 2,693,939 A | * | 11/1954 | Marchant et al. | 165/236 |
| 3,984,050 A | * | 10/1976 | Gustafsson | 237/2 B |
| 3,989,183 A | * | 11/1976 | Gustafsson | 237/2 B |
| 4,406,136 A | * | 9/1983 | Picchiottino | 62/238.6 |
| 4,438,881 A | * | 3/1984 | Pendergrass | 237/2 B |
| 4,448,037 A | * | 5/1984 | Hama et al. | 62/188 |
| 4,454,728 A | * | 6/1984 | Hanada et al. | 62/324.1 |
| 4,507,938 A | * | 4/1985 | Hama et al. | 62/324.1 |
| 4,770,000 A | * | 9/1988 | Kuroda et al. | 62/156 |
| 4,909,041 A | * | 3/1990 | Jones | 62/99 |
| 5,239,838 A | * | 8/1993 | Tressler | 62/324.1 |
| 5,664,421 A | * | 9/1997 | Matsue et al. | 62/6 |
| 6,874,694 B2 | * | 4/2005 | Saitoh et al. | 237/2 B |
| 7,234,646 B2 | * | 6/2007 | Saitoh et al. | 237/2 B |
| 7,823,799 B2 | * | 11/2010 | Sakai et al. | 237/19 |
| 2005/0150969 A1 | * | 7/2005 | Nakayama et al. | 237/12 |
| 2005/0189431 A1 | * | 9/2005 | Nakayama et al. | 237/12 |
| 2006/0213209 A1 | * | 9/2006 | Tanaami et al. | 62/238.6 |
| 2008/0135636 A1 | * | 6/2008 | Sakai et al. | 237/2 B |
| 2011/0120180 A1 | * | 5/2011 | Chin et al. | 62/510 |
| 2011/0155356 A1 | * | 6/2011 | Woo et al. | 165/141 |
| 2011/0197600 A1 | * | 8/2011 | Hamada et al. | 62/79 |
| 2011/0283725 A1 | * | 11/2011 | Sim | 62/151 |

FOREIGN PATENT DOCUMENTS

| | | | |
|---|---|---|---|
| CN | 1763457 A | * | 4/2006 |
| CN | 101201188 A | | 6/2008 |
| JP | 10-318635 | * | 12/1998 |

(Continued)

OTHER PUBLICATIONS

JP 2007198637 A, Mizushina et al, English machine translation, Aug. 9, 2007.*

(Continued)

*Primary Examiner* — Kang Hu
*Assistant Examiner* — Phillip E Decker
(74) *Attorney, Agent, or Firm* — McKenna Long & Aldridge LLP (57) ABSTRACT

A hot water circulation system is associated with a heat pump and is advantageous in that heating or hot water supply can be performed smoothly even when an outdoor unit performing a heat pump cycle performs a defrosting operation.

8 Claims, 5 Drawing Sheets

(56) References Cited

FOREIGN PATENT DOCUMENTS

| | | | |
|---|---|---|---|
| JP | 10-318635 A | * | 12/1998 |
| JP | 11-132603 | * | 5/1999 |
| JP | 11-132603 A | * | 5/1999 |
| JP | 2007071471 A | | 3/2007 |
| JP | 2007198637 A | * | 8/2007 |
| JP | 2007-333340 A | | 12/2007 |

OTHER PUBLICATIONS

CN 1763457 A, Chen, English machine translation, Apr. 26, 2006.*
JP 2007333340 A, English machine translation, Dec. 27, 2007.*
Toshiba Electric Appliance, JP2007-071471 A, Mar. 22, 2007, English machine translation.*
JP2007333340 A English machine translation, Dec. 27, 2007.*
Chen, CN 1763457 A English machine translation, Apr. 26, 2006.*

* cited by examiner

HOT WATER CIRCULATION SYSTEM ASSOCIATED WITH HEAT PUMP

This application claims priority to Republic of Korea Patent Application No. 10-2008-0076017, filed Aug. 4, 2008, which is hereby incorporated by reference in its entirety.

BACKGROUND OF THE INVENTION

1. Field of the Invention

The present invention relates to a hot water supply and heating system associated with a heat pump and a method for controlling the same.

2. Description of the Related Art

A hot water supply and heating apparatus associated with a heat pump is an apparatus which is combined with a heat pump cycle and a hot water circulation unit and performs heat-exchange between water and refrigerant discharged from a compressor which constitutes a heat pump refrigerant circuit to perform a hot water supply and a floor heating.

In a conventional system, a pipe for water flowing along a closed cycle for heating is separated from that for supplying hot water, and heat exchange is performed at each different spot of the pipe on the outlet side of the compressor of the heat pump refrigerant circuit. That is, in the conventional system, a water-refrigerant heat exchanger for heating and a water-refrigerant heat exchanger for hot water supply are separate.

In the conventional system, water supplied for hot water supply performs heat-exchange with the refrigerant, while passing through the water-refrigerant heat exchanger for hot water supply, and is then directly discharged.

The hot water supply and heating apparatus associated with the heat pump having the structure as described thus has the following problems.

Firstly, when frost is generated on a surface of an evaporator which constitutes the heat pump refrigerant circuit and a defrosting operation is thus needed, heating and hot water supply functions must stop completely until the defrosting operation is finished. During the defrosting operation, the hot water cannot thus be supplied and indoor temperature is also reduced. If a heating operation is also performed while the defrosting operation is performed, heat is transferred from the water-refrigerant heat exchanger to the refrigerant, so a temperature of the circulating water drops to cause a drop in a temperature of an indoor floor.

Secondly, even though the hot water supply and heating are performed again after the defrosting operation is finished, it takes some time for the heating circuit reaches a normal level and the hot water supplied reaches a set temperature.

Thirdly, the water-refrigerant heat exchanger for heating and the water-refrigerant heat exchanger for hot water supply are separate, so an installation process is complicated and a manufacturing cost is increased.

SUMMARY OF THE INVENTION

Accordingly, the present invention is directed to a refrigerator that substantially obviates one or more problems due to limitations and disadvantages of the related art.

An object of the present invention is to provide a hot water circulation system associated with a heat pump which reduces an installation process and a manufacturing cost and allows a hot water supply to be performed smoothly even during a defrosting operation, and a method for controlling the same.

In particular, an object of the present invention is to provide a hot water circulation system associated with a heat pump which allows a defrosting operation to be performed, while a hot water supply is normally performed, and a method for controlling the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with an embodiment of the present invention, there is provided a hot water circulation system associated with a heat pump, comprising: an outdoor unit including a compressor, an outdoor heat-exchanger, and an expansion part, and performing a heat pump refrigerant cycle; an indoor unit including a water-refrigerant heat-exchanger which performs heat exchange between a refrigerant discharged from the compressor and water; and a hot water circulation unit receives heat from the heated water discharged from the indoor unit to perform hot water supply or heating; and a connection pipe which connects inlet and outlet sides of the indoor unit to allow water passing through the water-refrigerant heat-exchanger to circulate inside the indoor unit, during a defrosting operation of the outdoor unit.

In accordance with an embodiment of the present invention, there is provided a method for controlling a hot water circulation system associated with a heat pump, the hot water circulation system associated with a heat pump comprising an outdoor unit including a compressor, an outdoor heat-exchanger, and an expansion part to perform a heat pump refrigerant cycle; an indoor unit including a water-refrigerant heat-exchanger which performs heat exchange between a refrigerant discharged from the compressor and water, a water collection tank in which water passing through the water-refrigerant heat-exchanger is stored, and a water pump pumping water discharged from the water collection tank; and a hot water circulation unit which receives heat from the water pumped by the water pump to perform hot water supply or heating, the method comprising: during a defrosting operation of the outdoor unit, allowing water discharged from the water collection tank to be introduced directly into the water-refrigerant heat-exchanger without performing any one of or both hot water supply and heating.

In accordance with another embodiment of the present invention, there is provided a hot water circulation system associated with a heat pump, the hot water circulation system comprising: an outdoor unit including a compressor, an outdoor heat-exchanger, and an expansion part, and performing a heat pump refrigerant cycle; an indoor unit including a water-refrigerant heat-exchanger which performs heat exchange between a refrigerant discharged from the compressor and water, a water collection tank in which water passing through the water-refrigerant heat-exchanger is stored, and a water pump pumping water discharged from the water collection tank; a hot water supply unit performing heat exchange with water pumped by the water pump; a channel switching valve provided in an outlet side of the water pump; and a defrosting channel extended from the channel switching valve, wherein, during a defrosting operation, water pumped by the water pump flows along the defrosting channel to be mixed with water stored in the hot water supply unit, and some of the mixed water flows onto the water-refrigerant heat-exchanger.

According to a hot water circulation system associated with a heat pump having the configuration as described above and a method for controlling the same, hot water supply and floor heating can be performed selectively using a single hot water circulation closed cycle.

More specifically, a single water-refrigerant heat-exchanger performing heat exchange with a heat pump refrigerant cycle is provided, making it possible to reduce an installation process and a manufacturing cost of the system.

Hot water supply can also be performed smoothly even while a defrosting operation is performed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, the exemplary embodiments of the present invention will be described in more detail with reference to the accompanying drawings.

Figure 1:
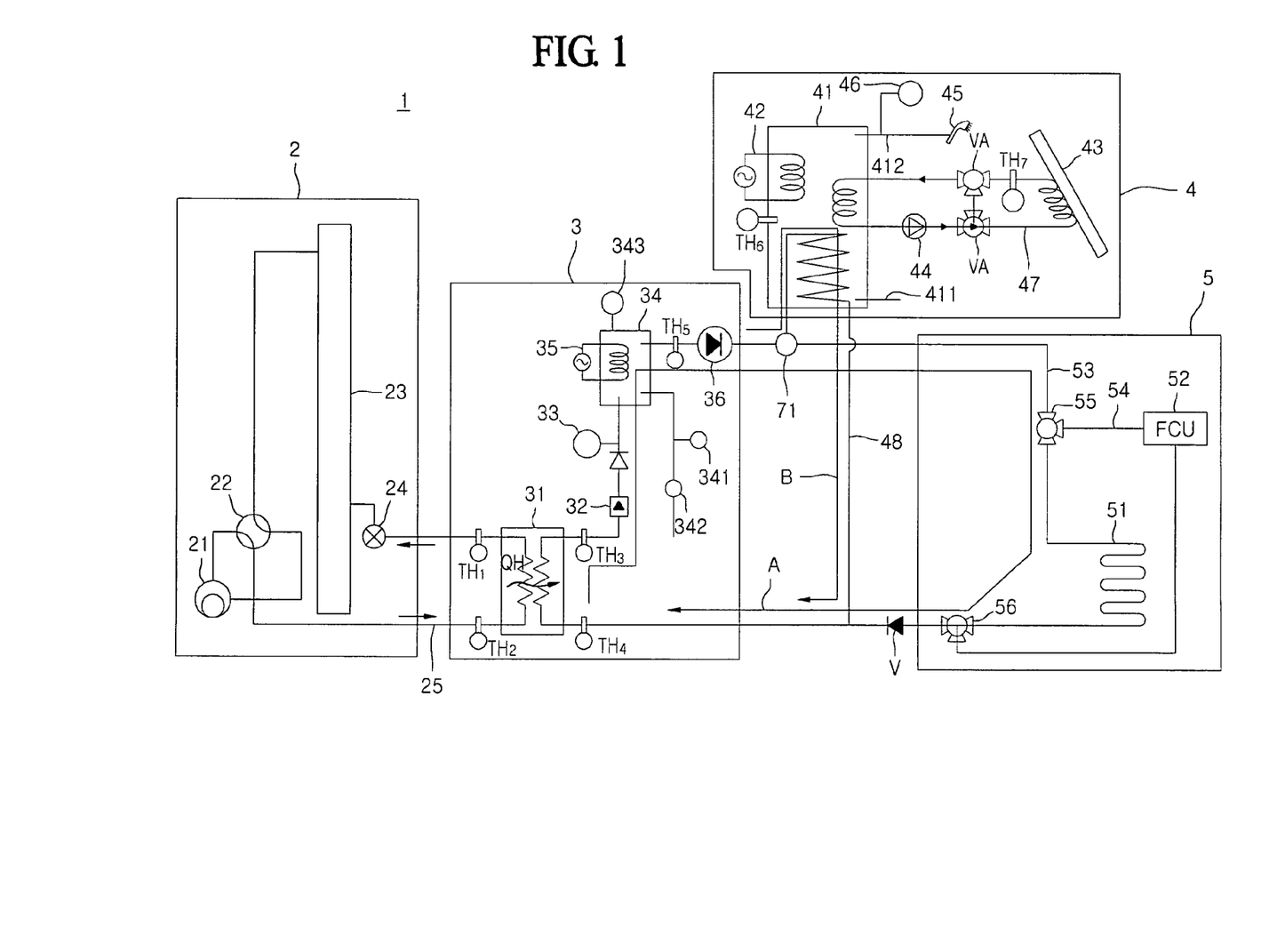
FIG. 1 is a view showing a hot water circulation system associated with a heat pump according to a first embodiment of the present invention.
Figure 2:
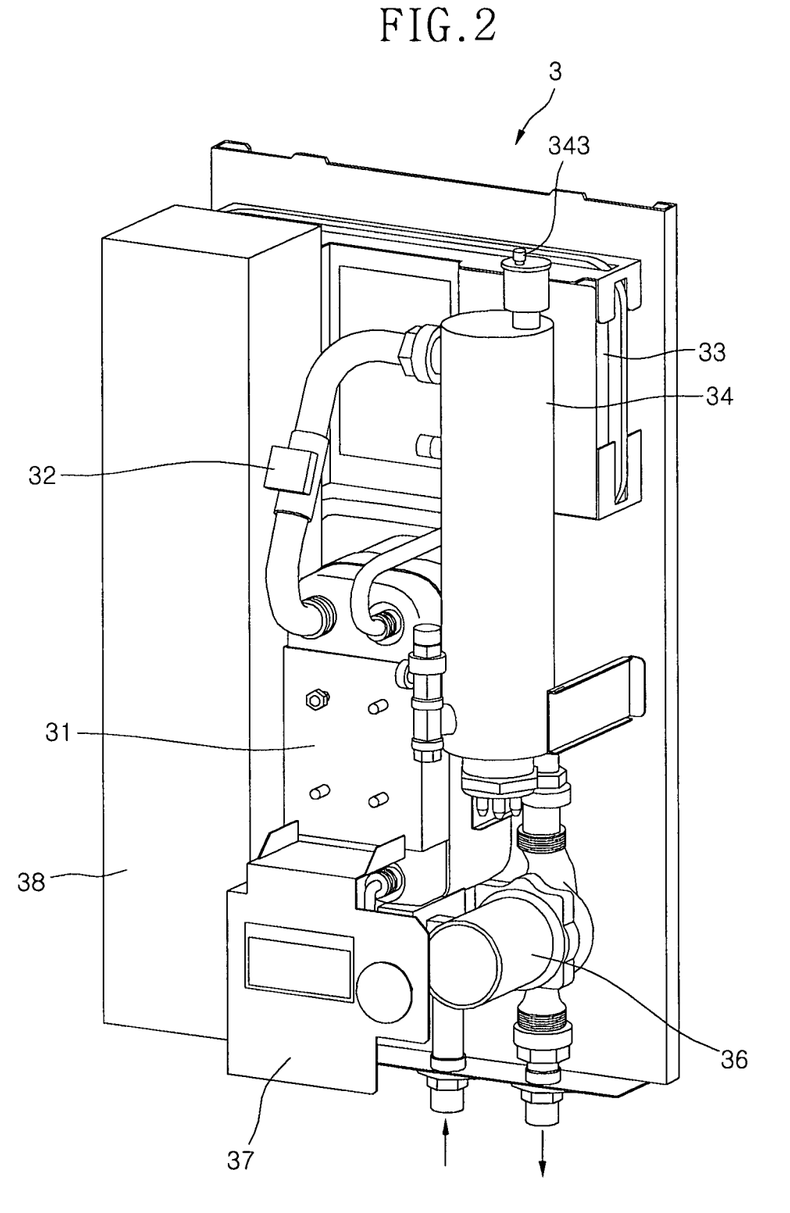
FIG. 2 is a perspective view showing a configuration of an indoor unit which constitutes the hot water circulation system associated with the heat pump.

FIG. 1 is a view showing a hot water circulation system associated with a heat pump according to a first embodiment of the present invention, and FIG. 2 is a perspective view showing a configuration of an indoor unit which constitutes the hot water circulation system associated with the heat pump.

Referring to FIGS. 1 and 2, the hot water circulation system associated with a heat pump 1 includes an outdoor unit 2 in which a heat pump refrigerant cycle is included, an indoor unit 3 which heats water by performing heat-exchange with a refrigerant whose phase is changed along the heat pump refrigerant cycle, a hot water supply unit 4 which is connected heat-exchangeably to a portion of the indoor unit 3 to supply hot water, and a heating unit which consists of a water pipe extended from the indoor unit 3.

More specifically, the heat pump refrigerant cycle includes a compressor 21 which compresses a refrigerant at high temperature and at high pressure, a four-way valve 22 which controls a flow direction of the refrigerant discharged from the compressor 21, a water-refrigerant heat exchanger 31 which performs heat exchange between the high-temperature and high-pressure refrigerant which has passed through the four-way valve 22 and water flowing along a water pipe of the indoor unit 3, an expansion part 24 which expands the refrigerant which has passed through the water-refrigerant heat exchanger 31 at low temperature and at low pressure, and an outdoor heat-exchanger 23 which performs heat-exchange between the refrigerant which has passed through the expansion part and outdoor air. These components are connected to each other through a refrigerant pipe 25 to form a closed cycle. The outdoor unit 2 includes the compressor 21, the four-way valve 22, the expansion unit 24, and the outdoor heat-exchanger 23. When the outdoor unit 2 is operated in a cooling mode, the outdoor heat-exchanger 23 functions as a compressor, and when the outdoor unit 2 is operated in a heating mode, the outdoor heat-exchanger 23 functions as an evaporator. Respective temperature sensors TH1, TH2 may be mounted on refrigerant pipes on inlet and outlet sides of the water-refrigerant heat-exchanger 31.

Hereinafter, the present invention will be described by limiting the hot water circulation system associated with a heat pump 1 to be operated in a heating mode, excepting for the case when the hot water circulation system associated with a heat pump 1 is operated in a defrosting operation.

The indoor unit 3 includes the water-refrigerant heat-exchanger 31, a flow switch which is mounted on the water pipe extended to an outlet side of the water-refrigerant heat-exchanger 31 to sense the flow of water, an expansion tank 33 which is branched at a certain spot spaced from the flow switch 32 in the flow direction of water, a water collection tank 34 to which an end of the water pipe extended from the outlet side of the water-refrigerant heat-exchanger 31 is inserted and an auxiliary heater 35 is provided therein, and a water pump 36 which is provided at a certain spot of the water pipe on the outlet side of the water collection tank 34.

More specifically, the water-refrigerant heat-exchanger 31 is a portion where the heat-exchange is performed between the refrigerant flowing along the heat pump refrigerant cycle and water flowing along the water pipe, and a plate-type heat-exchanger may be applied to the water-refrigerant heat-exchanger 31. In the water-refrigerant heat-exchanger 31, heat QH is transferred from the high-temperature high-pressure gas refrigerant passing through the compressor 21 to the water flowing along the water pipe. The water flowing into the water-refrigerant heat-exchanger 31 is tepid through the hot water supply process or the heating process. Respective temperature sensors TH3, TH4 may be mounted on water pipes on inlet and outlet sides of the water-refrigerant heat-exchanger 31.

When the volume of water heated by passing through the water-refrigerant heat-exchanger 31 is expanded exceeding appropriated levels, the expansion tank 33 functions as a buffer absorbing the overexpanded water. Diaphragms are included inside the expansion tank 33 to move in response to the change of the volume of water. The inside of the expansion tank 33 is filled with nitrogen gas.

The water collection tank 34 is a container where the water passing through the water-refrigerant heat-exchanger 31 is collected. An auxiliary heater 35 is mounted to the inside of the water collection tank 34 to be selectively operated, when the quantity of heat sucked through the defrosting operation process or the water-refrigerant heat-exchanger 31 does not reach the quantity of heat requested. An air vent 343 is formed on the upper side of the water collection tank 34 to allow air overheated in the water collection tank 34 to be exhausted. A pressure gage 341 and a relief valve 342 are provided on one side of the water collection tank 34 to enable the pressure inside the water collection tank 35 to be controlled appropriately. For example, when the water pressure inside the water collection tank 35 indicated by the pressure gage 341 is excessively high, the relief valve 342 is opened to ensure that the pressure inside the tank can be controlled appropriately. A temperature sensor TH5 which measures a water temperature may also be mounted on one side of the water collection tank 34.

Also, the water pump 36 pumps water discharged through the water pipe extended from the outlet side of the water collection tank 34 to supply the water to a hot water supply unit 4 and a heating unit 5.

Also, a control box 38 in which various electric components are stored is mounted on one side of the inside of the indoor unit 3, and a control panel 37 is provided on a front surface of the indoor unit 3. More specifically, the control panel 37 may include a display unit such as a LCD panel, and various input buttons. A user may check operation information such as an operation condition of the indoor unit 3 or a water temperature passing through the indoor unit 3 and other menu, etc., using the display unit.

The hot water supply unit 4 is a portion where water used for the user in washing his or her face or washing the dishes is heated and supplied.

More specifically, a channel switching valve 71 which controls the flow direction of water is provided at a certain spot spaced from the water pump 36 in the flow direction of water. The channel switching valve 71 may be a three-way valve which allows the water pumped by the water pump 36 to be flowed to the hot water supply unit 4 or the heating unit 5. A hot water supply pipe 48 extended to the hot water supply unit and a heating pipe 53 extended to the heating unit 5 are thus connected to the outlet side of the channel switching valve 71, respectively. The water pumped by the water pump 36 is selectively flowed to any one of the hot water supply pipe 48 and heating pipe 53 according to the control of the channel switching valve 71.

The hot water supply unit 4 includes a hot water supply tank 41 in which water supplied from the outside of the hot water supply unit 4 is stored and heated, and an auxiliary heater 42 provided inside the hot water supply tank 41. An auxiliary heat source which supplies heat to the hot water supply tank 41 may further be included according to the installation form of the hot water supply unit 4. A heat storage tank 43 using a solar cell panel may be suggested as the auxiliary heat source. An inlet part 411 into which cold water is flowed and an outlet part 412 through which heated water is discharged are provided on one side of the hot water supply unit 4.

More specifically, a portion of the hot water supply pipe extended from the channel switching valve 71 is inserted into the hot water supply tank 41 to heat water stored inside the hot water supply tank 41. In other words, heat is transferred from high-temperature water flowing along the inside of the hot water supply pipe 48 to water stored in the hot water supply tank 41. In a certain case, additional heat may also be supplied by operating the auxiliary heater 42 and auxiliary heat source. The auxiliary heater 42 and auxiliary heat source may be operated when water must be heated in a short time, for example, when a user needs a considerable amount of hot water in order to take a shower. A temperature sensor which senses a water temperature may be mounted on one side of the hot water supply tank 41.

A hot water discharging apparatus such as a shower 45 or a home appliance such as a humidity 46 may be connected to the outlet part 412 according to embodiments. When the heat storage tank 43 using the solar cell panel is used as the auxiliary heat source, an auxiliary pipe 47 extended from the heat storage tank 43 may be inserted into the inside of the hot water supply tank 41. An auxiliary pump 44 which controls flow velocity inside a closed cycle of the auxiliary pipe and a direction switching valve VA which controls the flow direction of water inside the auxiliary pipe 47 may be mounted on the auxiliary pipe 47. A temperature sensor TH7 which measures a water temperature may also be mounted on any one side of the auxiliary pipe 47.

The structure of the auxiliary heat source such as the heat storage tank using the solar cell panel is not limited to the embodiment proposed above, but the auxiliary heat source may be mounted on other positions, having diverse forms.

Meanwhile, the heating unit 5 includes a floor heating unit 51 formed by burying a portion of the heating pipe 53 in an indoor floor, and an air heating unit 52 branched from any spot of the heating pipe 53 to be connected to the floor heating unit 51 in parallel.

More specifically, the floor heating unit 51 may be laid under the indoor floor in a meander line form, as shown in FIG. 1. The air heating unit 52 may be a fan coil unit or a radiator. In the air heating unit 52, a portion of an air heating pipe 54 branched from the heating pipe 53 is provided as a heat-exchange means. On the spots branched from the air heating pipe 54, channel switching valves 55, 56 such as a three-way valve are installed to allow the refrigerant flowing along the heating pipe 53 to be flowed onto the floor heating unit 51 and the air heating unit 52, or to be flowed onto only any one of the floor heating unit 51 and the air heating unit 52.

An end of the hot water supply pipe 48 extended from the channel switching valve 71 is combined at the spot spaced from an outlet end of the air heating pipe 54 in the flow direction of water. In a hot water supply mode, the water flowing along the hot water pipe 48 is thus put together into the heating pipe 53 again and is then flowed into the water-refrigerant heat-exchanger 31.

Here, a check valve V is installed on a spot required to cut off a counter flow, such as a spot where the heating pipe 48 and the heating pipe 53 are combined, making it possible to prevent the counter flow of water. In this regard, check valves can be installed on an outlet end of the air heating pipe 54 and an outlet end of the floor heating unit 51, respectively, instead of the method that the channel switching valve 56 is installed on the outlet ends.

Hereinafter, the flow of water occurring in the hot water circulation system associated with the heat pump will be described for each operation mode.

In the hot water supply mode, the flow of water is controlled by the channel switching valve 71 to be flowed onto the hot water supply pipe 48. Therefore, water circulates along a closed cycle B in which a water-refrigerant heat-exchanger 31, a water collection tank 34, a water pump 36, a channel switching valve 71 and a hot water supply pipe 48 are connected. During such a circulation process, cold water flowed into an inlet part 411 of the hot water supply tank 41 is heated and then discharged into the outside of the water supply tank 41 through an outlet part 412 thereof, thereby being supplied to a user.

In the heating mode, the flow of water is controlled by the channel switching valve 71 to be flowed onto the heating pipe 53. Therefore, water circulates along a closed cycle A in which a water-refrigerant heat-exchanger 31, a water collection tank 34, a water pump 36, a channel switching valve 71 and a hot water supply pipe 48 are connected. The water flowing along the heating pipe 53 thus flows onto the air heating unit 52 or the floor heating unit 51.

In the system having the configuration as described above, if the outdoor unit 2 performs a heat pump refrigerant cycle for a long time, a surface of the outdoor heat-exchanger 23 is frozen so that a heat-exchange with external air is not smooth. Therefore, when a temperature of the outdoor heat-exchanger 23 becomes below a set temperature, ice generated on the surface of the outdoor heat-exchanger 23 must be removed by performing a defrosting operation. In the defrosting operation, a refrigerant cycle is made in the opposite direction to a heating operation. In other words, the outdoor heat-exchanger 23 functions as a compressor, and a low-temperature low-pressure two-phase refrigerant flows on the water-refrigerant heat-exchanger 31.

Under such an object, when the defrosting operation starts in the outdoor unit 2, the channel switching valve 71 operates to allow water passing through the water pump 36 to be flowed onto only the hot water supply pipe 48, making it possible for the water to be returned to the water-refrigerant heat-exchanger 31 without passing through the heating unit 5. In other words, water circulates along the closed cycle B in which a water-refrigerant heat-exchanger 31, a water collection tank 34, a water pump 36, a channel switching valve 71 and a hot water supply pipe 48 are connected. Then, water does not flow onto al least the heating unit 5, making it possible to remove a phenomenon that a floor heating efficiency is suddenly reduced. If a user wishes to use hot water while the defrosting operation is performed, he or she may operate an auxiliary heater 42 installed on the hot water supply tank 41.

An auxiliary heater 35 installed on the water collection tank 34 is operated in order to minimize a time required in the defrosting operation, making it possible to increase the amount of heat-exchange between the refrigerant and water in the water-refrigerant heat-exchanger 31.

Figure 3:
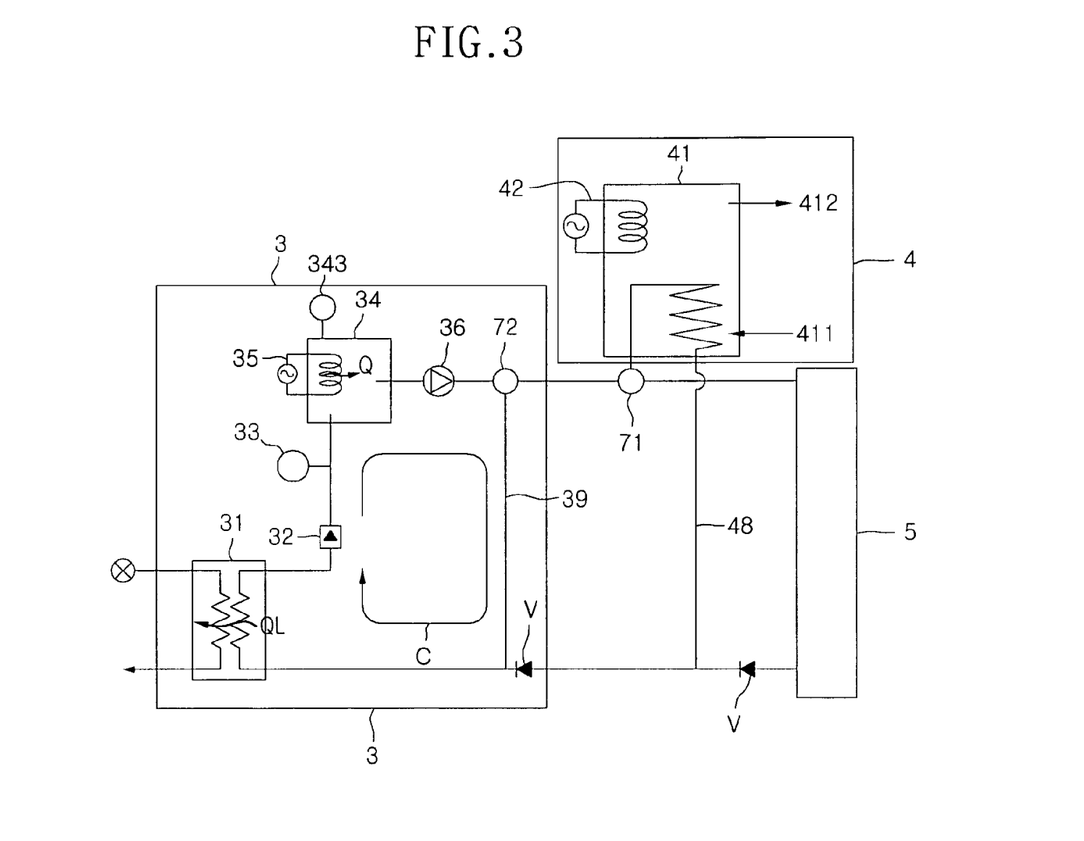
FIG. 3 is a view showing a hot water circulation system associated with a heat pump according to a second embodiment of the present invention.

FIG. 3 is a view showing a hot water circulation system associated with a heat pump according to a second embodiment of the present invention.

Referring to FIG. 3, the second embodiment shows a configuration that during the defrosting operation of an outdoor unit 2, water passing through an indoor unit 3 does not flow onto a heating unit 5 and a hot water supply unit 4, but circulates inside the indoor unit 3. Here, the second embodiment is different from the first embodiment, the second embodiment further including a connection pipe 39 which connects a certain spot between an outlet of the water pump 36 and the channel switching valve 71 to a water pipe on an inlet side of the water-refrigerant heat-exchanger 31. Other configuration of the second embodiment is the same as the first embodiment. The detailed description of the same configuration as the first embodiment will thus be omitted.

More specifically, a channel switching valve 72 such as a three-way valve is mounted on an inlet side of the connection pipe 39. When the outdoor unit 2 is converted into a defrosting operation mode, the channel switching valve 72 operates to allow the flow of water passing through the water pump 36 to be switched into the connection pipe 39. A check valve V which prevents a counter flow of water may also be installed around an outlet end of the connection pipe 39.

Hereinafter, when a defrosting operation is performed in the system, the flow of water and refrigerant will be described.

More specifically, when the defrosting operation is performed, if water passing through the indoor unit 3 passes through the hot water supply unit 4 or the heating unit 5 and circulates, cold water is discharged from the heating unit 4 and low-temperature water flows on the heating unit 5, thereby causing a problem that an indoor temperature drops. This is the reason that since a low-temperature low-pressure refrigerant passing through the expansion unit 24 is supplied to the water-refrigerant heat-exchanger 31, the water flowing along the water-pipe becomes cold through heat exchange.

In order to solve the problem, the second embodiment allows water to be flowed onto the connection pipe 39 and thus allows the water not to be flowed onto the heating unit 5 and hot water supply unit 4.

More specifically, as heat QL of water flowed into the water-refrigerant heat-exchanger 31 is taken away toward the refrigerant, a temperature of the water drops. The water passing through the water-refrigerant heat-exchanger 31 is collected into the collection tank 34 and is heated by the operation of the auxiliary heater 35 attached to the water collection tank 34. The temperature of water is then raised again and the heated water is pumped by the water pump 36. The water pumped by the water pump 36 flows onto the connection pipe 39 by the operation of the channel switching valve 72. The water flowing along the connection pipe 39 flows onto the heating pipe 53 again to be flowed into the water-refrigerant heat-exchanger 31. That is, the flow of water inside the indoor unit 3 forms a closed cycle C.

During the defrosting operation, if a user wishes to use hot water, he or she may operate an auxiliary heater 42 installed on the hot water supply tank 41. That is, the water flowed into the inlet part 411 is heated by the auxiliary heater 42 and is then discharged into the outlet part 412.

As an auxiliary heater 35 installed on the water collection tank 34 is operated during the defrosting operation, the water circulating inside the indoor unit 3 is not cooled but maintains at least a warm condition. Therefore, even though the defrosting operation is completed and the heat pump refrigerant cycle for heating or hot water supply is started, an indoor temperature is not further dropped by water flowing onto the hot water supply unit 4 or cold water is not discharged to the outlet part 412.

Figure 4:
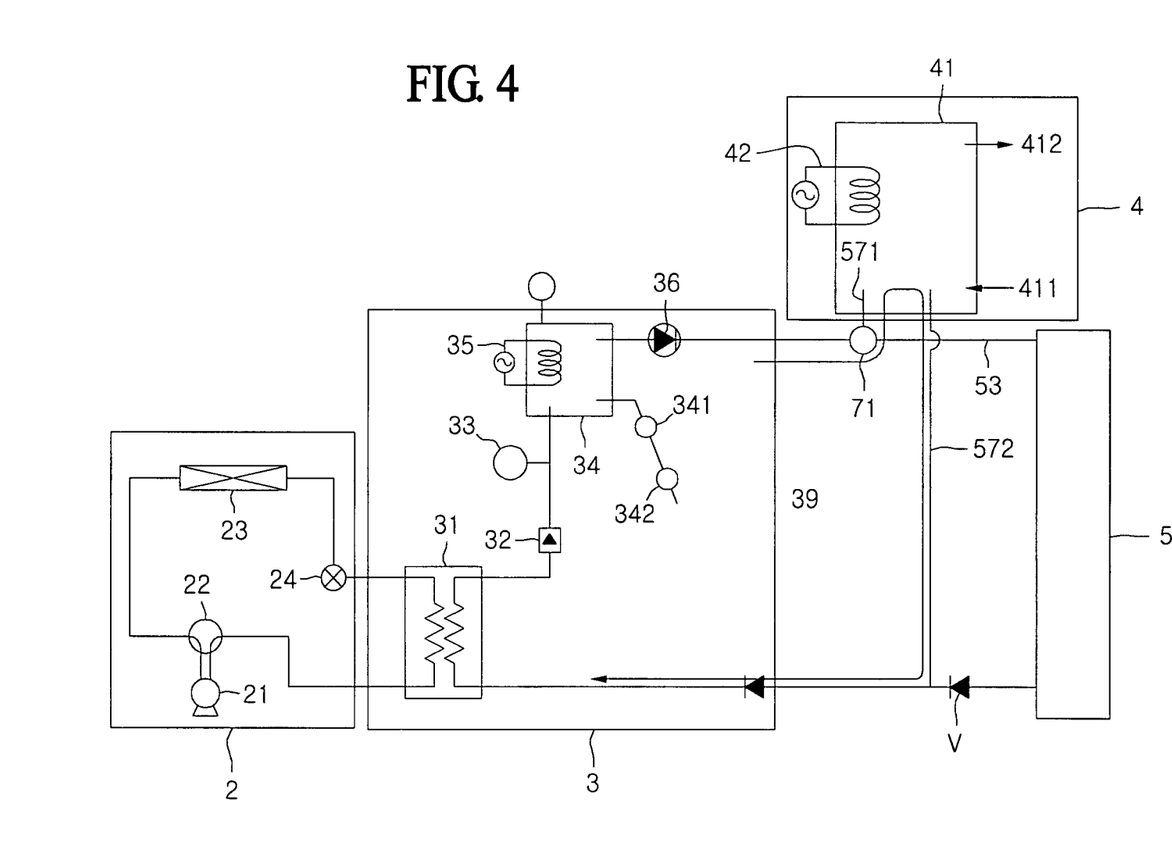
FIG. 4 is a view showing a hot water circulation system associated with a heat pump according to a third embodiment of the present invention.

FIG. 4 is a view showing a hot water circulation system associated with a heat pump according to a third embodiment of the present invention.

Referring to FIG. 4, the third embodiment shows the same configuration as that of the first embodiment shown in FIG. 1, except that water stored in the hot water supply tank 41 is flowed directly into the water-refrigerant heat-exchanger 31. The detailed description of the same portion as the configuration of FIG. 1 will be omitted.

More specifically, the first embodiment shown in FIG. 1 shows that water supplied to the hot water supply tank 41 by the channel switching valve 71 performs heat exchange with water stored in the hot water supply tank 41, not being mixed therewith, and then flows onto the water-refrigerant heat-exchanger 31. However, the third embodiment shows that water whose channel is switched by the channel switching valve 71 is mixed with water stored in the hot water supply tank 41. Some of the water mixed in the hot water supply tank 41 is flowed again into the water-refrigerant heat-exchanger 31.

To this end, a defrosting pipe 571 is extended from an outlet end on the hot water supply tank 41 of the channel switching valve 71 to be connected to the hot water supply tank 41, and a defrosting pipe 572 is also extended from the hot water supply tank to be connected to an inlet side of the water-refrigerant heat-exchanger 31. In other words, as shown in FIG. 1, a portion extended into the inside of the hot water supply tank 41 is removed. Water pumped by the water pump 36 is thus supplied to the hot water supply tank 41 to be mixed with water stored inside the hot water supply tank 41. Some of the mixed water is discharged to the defrosting pipe 572 extended from the water tank 41. Here, temperature compensation is made through the mixing process of water inside the hot water supply tank 41. In other words, a temperature of water discharged into the defrosting pipe 572 becomes at least higher than a temperature of water on an outlet side of the water-refrigerant heat-exchanger 31. While the indoor unit 2 performs the defrosting operation, the refrigerant passing through the expansion part 24 thus absorbs heat, passing through the water-refrigerant heat-exchanger 31. An auxiliary heater 42 mounted on the hot water supply tank 41 operates to enable water stored in the hot water supply tank 41 to be heated during the defrosting operation.

Meanwhile, although not shown, the system shown in FIG. 1 and the system shown in FIG. 4 may form each separate system, however, there may also be formed a system in which the system in FIG. 1 remains and a separate channel switching valve is added thereto, that is, the system in FIG. 4 is added.

More specifically, the present invention may provide a channel for hot water supply in which water pumped by the water tank 36 performs only heat exchange with water stored in the hot water supply tank 41, not being mixed therewith, and then flows onto the water-refrigerant heat-exchanger 31, as shown in FIG. 1, and a channel for defrosting in which pumped water is mixed in the hot water supply tank 41, as shown in FIG. 4. The present invention may also allow water passing through the water pump 36 to flow onto any one of the channel for heating and channel for defrosting according to the heating operation and defrosting operation.

Figure 5:
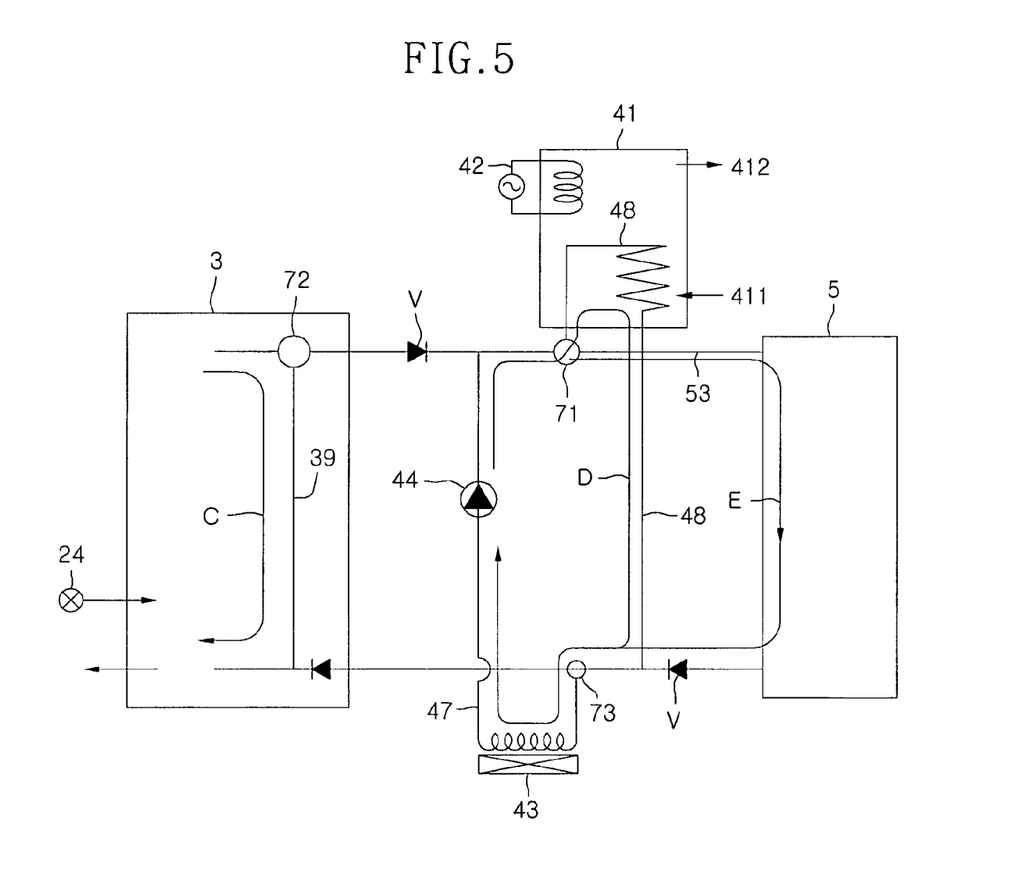
FIG. 5 is a view showing a hot water circulation system associated with a heat pump according to a fourth embodiment of the present invention.

FIG. 5 is a view showing a hot water circulation system associated with a heat pump according to a fourth embodiment of the present invention.

Referring to FIG. 5, the fourth embodiment shows that during the defrosting operation of an outdoor unit 2, there are formed a closed cycle C in which water passing through an indoor unit 3 does not flow onto a heating unit 5 and a hot water supply unit 4, but circulates inside the indoor unit 3, and a separate closed cycle E in which the water passing through an indoor unit 3 circulates the heating unit 5 and an auxiliary heating unit or a separate closed cycle D in which the water passing through an indoor unit 3 circulates the hot water supply unit 4 and an auxiliary unit. To this end, the fourth embodiment is different from the second embodiment, the fourth embodiment further including an auxiliary heat source and an auxiliary pump which constitutes an auxiliary heating unit. Other configuration of the fourth embodiment is the same as the second embodiment. The detailed description of the same configuration as the second embodiment will thus be omitted.

More specifically, a channel switching valve 73 such as a three-way valve is installed at a certain spot spaced from a spot where an outlet end of the hot water supply pipe 48 and a heating pipe 53 are combined in the flow direction of water. An auxiliary pipe 47 is branched from the channel switching valve 73, and its end corresponding to an outlet side is combined with the heating pipe 53 at a certain spot between a channel switching valve 72 on the side of the connection pipe 39 and a channel switching valve 72 on the side of the hot water supply pipe 48. A check valve V may also be installed on the rear side of the combined spot. A heat storage tank 43 configured of a solar cell panel may be provided on one side of the auxiliary pipe 47, and an auxiliary pump 44 may be installed in front of the heat storage tank 43. Such a configuration is the same as the configuration of the auxiliary heat source provided in the hot water supply unit 4 of FIG. 1.

Under the configuration as described above, when the defrosting operation of the outdoor unit 2 starts, water passing through a water-refrigerant heat-exchanger 31 by the channel switching valve 72 flows along the connection pipe 39 to form a closed cycle C. The flow of water passing through the channel switching valve 72 forms a closed cycle D in which water circulates the heating pipe 48 and an auxiliary pipe 47, or a closed cycle E in which water circulates the heating pipe 53 and an auxiliary pipe 47. In other words, any one of the closed cycle D and closed cycle E is formed depending on the condition of the channel switching valve 71.

For example, during the defrosting operation, if a user wishes to use hot water, the channel switching valve 71 operates to allow water to be flowed toward only the hot water supply pipe 48, and in other cases, the channel switching valve 71 operates to allow water to be flowed toward the heating pipe 53.

The water flowing along the closed cycle D or the closed cycle E flows continuously by the auxiliary pump 44.

Meanwhile, a single heat storage tank 43 is provided on outlet ends of the hot water supply pipe 47 and heating pipe 53 in FIG. 5, however, the present invention is not limited to such a configuration. In other words, a plurality of heat storage tanks 43 may be mounted on the hot water supply pipe 48 and heating pipe 53, respectively, while maintaining the original position of the auxiliary pump 44. An electric heater may also be applied, instead of the heat storage tank 43.

According to the system as described above, while the outdoor unit 2 performs a defrosting operation, a user can use hot water and a phenomenon that a temperature of indoor floor is suddenly dropped can also be improved.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A hot water circulation system associated with a heat pump, comprising:
   an outdoor unit including a compressor, an outdoor heat-exchanger, and an expansion part, and performing a heat pump refrigerant cycle;
   an indoor unit including a water-refrigerant heat-exchanger which performs heat exchange between a refrigerant discharged from the compressor and water;
   a hot water supply unit that is disposed on outlet side of the water-refrigerant heat exchanger and receives heat from heated water discharged from the water-refrigerant heat-exchanger to perform hot water supply, the hot water supply unit including a water supply tank to store hot water;
   a heating unit that is disposed on outlet side of the water-refrigerant heat exchanger and receives heat from heated water discharged from the water-refrigerant heat-exchanger to perform heating;
   an inlet pipe coupled to an inlet of the water-refrigerant heat-exchanger;
   an outlet pipe coupled to an outlet of the water-refrigerant heat-exchanger;
   a first channel switching valve installed at the outlet pipe to guide water discharged from the water-refrigerant heat-exchanger to one of the water supply tank of the hot water supply unit and the heating unit;
   a second channel switching valve installed between the water-refrigerant heat-exchanger and the first channel switching valve to bypass water discharged from the water-refrigerant heat-exchanger to the inlet pipe in a predetermined operation mode;

a first connection pipe that connects the second channel switching valve and the inlet pipe to supply water discharged from the second channel switching valve to the inlet pipe; and a second connection pipe that connects the first channel switching valve and the second channel switching valve;

an auxiliary heating unit heating water passing through the hot water supply unit or the heating unit during the defrosting operation, wherein the hot water supply unit includes:

a hot water supply pipe branched from the first channel switching valve to be connected to inlet pipe, a portion of the hot water supply pipe being inserted into the water supply tank, and a heater heating water inside the water supply tank, wherein, during the defrosting operotion, at least one or both the heater of the hot water supply unit and the auxiliary heating unit operate;

a floor heating unit formed by burying a portion of a water pipe extended from a discharge side of the indoor unit in the floor; and an air heating unit heating indoor air, wherein an outlet end of the hot water supply pipe and an outlet end of the floor heating unit are combined at a predetermined position, and counter flow prevention valves are respectively provided in the outlet ends of the hot water supply pipe and floor heating unit.

2. The hot water circulation system as claimed in claim 1, wherein the indoor unit comprises:

a flow switch provided in a water pipe at an outlet side of the water-refrigerant heat-exchanger to detect the flow of water;

an expansion tank provided at a predetermined position of the water pipe to operate corresponding to the change of volume of water flowing along the water pipe;

a water collection tank connected to an end of the water pipe to store water passing through the water-refrigerant heat-exchanger;

a water pump provided to a water pipe at an outlet side of the water collection tank to pump water discharged from the water collection tank; and an auxiliary heater provided in the water collection tank.

3. The hot water circulation system as claimed in claim 1, wherein the auxiliary heating unit includes:

an auxiliary heat source including an electric heater or a solar cell panel;

an auxiliary pipe allowing water passing through the hot water supply unit or water passing through the heating unit to form a closed cycle independent from a water cycle inside the indoor unit;

a third channel switching valve provided at a position where the auxiliary pipe is branched; and an auxiliary pump provided to a predetermined position of the auxiliary pipe.

4. The hot water circulation system as claimed in claim 3, wherein the auxiliary heat source is provided only to a position which corresponds to an outlet side of both the hot water supply unit and the heating unit, or provided respectively to the pipes constituting the hot water supply unit and the heating unit.

5. The hot water circulation system as claimed in claim 1, wherein the heating unit includes:

an air heating unit heating indoor air, wherein the air heating unit includes a fan coil unit or a radiator.

6. A method for controlling a hot water circulation system associated with a heat pump, the hot water circulation system associated with a heat pump comprising an outdoor unit including a compressor, an outdoor heat-exchanger, and an expansion part to perform a heat pump refrigerant cycle; an indoor unit including a water-refrigerant heat-exchanger which performs heat exchange between a refrigerant discharged from the compressor and water, a hot water supply unit that is disposed on outlet side of the water-refrigerant heat exchanger and receives heat from heated water discharged from the water-refrigerant heat-exchanger to perform hot water supply, the hot water supply unit including a water supply tank to store hot water; a heating unit that is disposed on outlet side of the water-refrigerant heat exchanger and receives heat from heated water discharged from the water-refrigerant heat-exchanger to perform heating; an inlet pipe coupled to an inlet of the water-refrigerant heat-exchanger; an outlet pipe coupled to an outlet of the water-refrigerant heat-exchanger, a first channel switching valve installed at the outlet pipe to water discharged from the water-refrigerant heat-exchanger to one of the water supply tank of the hot water supply unit and the heating unit; a second channel switching valve installed between the water-refrigerant heat-exchanger and the first channel switching valve to bypass water discharged from the water-refrigerant heat-exchanger to the inlet pipe in a predetermined operation mode; a first connection pipe that connects the second channel switching valve and the inlet pipe supply water discharged from the second channel switching valve to the inlet pipe; and a second connection pipe that connects the first channel switching valve and the second channel switching valve; an auxiliary heating unit heating water passing through the hot water supply unit or the heating unit during the defrosting operation, wherein the hot water supply unit includes: a hot water supply pipe branched from the first channel switching valve to be connected to inlet pipe, a portion of the hot water su pipe being inserted into the water supply tank, and a heater heating water inside the water supply a floor heating unit formed by burying a portion of a water pipe extended from a discharge side of the indoor unit in the floor; and an air heating unit heating indoor air, wherein an outlet end of the hot water supply pipe and an outlet end of the floor heating unit are combined at a predetermined position, and counter flow prevention valves are respectively provided in the outlet ends of the hot water supply pipe and floor heating unit, the method comprising:

during the defrosting operation, at least one or both the heater of the hot water supply unit and the auxiliary unit operate.

7. The method as claimed in claim 6, further comprising a third channel switching valve, wherein the operation of the third channel switching valve is controlled so that a pipe for hot water supply constituting the hot water circulation unit and an auxiliary pipe connecting an inlet side of the indoor unit to an outlet side thereof form a closed water cycle independent from the indoor unit.

8. The method as claimed in claim 6, further comprising a third channel switching valve, wherein the operation of the third channel switching valve is controlled so that a heating pipe constituting the hot water circulation unit and an auxiliary pipe connecting an inlet side of the indoor unit to an outlet side thereof form a closed water cycle independent from the indoor unit.

* * * * *